(12) United States Patent
Zoller

(10) Patent No.: US 7,527,075 B2
(45) Date of Patent: May 5, 2009

(54) FLOW REGULATOR

(75) Inventor: Uwe Zoller, Mullheim (DE)

(73) Assignee: Neoperl GmbH, Mullheim (DE)

( * ) Notice: Subject to any disclaimer, the term of this patent is extended or adjusted under 35 U.S.C. 154(b) by 77 days.

(21) Appl. No.: 11/908,316

(22) PCT Filed: Mar. 2, 2006

(86) PCT No.: PCT/EP2006/001895

§ 371 (c)(1),
(2), (4) Date: Sep. 11, 2007

(87) PCT Pub. No.: WO2006/097200

PCT Pub. Date: Sep. 21, 2006

(65) Prior Publication Data

US 2008/0277010 A1   Nov. 13, 2008

(30) Foreign Application Priority Data

Mar. 14, 2005 (DE) .................. 20 2005 004 196 U

(51) Int. Cl.
*F16K 15/08* (2006.01)

(52) U.S. Cl. .................... 138/43; 138/45; 138/46; 137/493; 239/533.1

(58) Field of Classification Search .......... 138/43, 138/45, 46; 137/504, 515.7, 512.1, 493.9, 137/493; 239/533.1, 533.13, 533.14, 72
See application file for complete search history.

(56) References Cited

U.S. PATENT DOCUMENTS

| | | | | |
|---|---|---|---|---|
| 2,914,084 A | * | 11/1959 | McLean et al. ............. | 137/504 |
| 3,138,177 A | * | 6/1964 | Cutler ......................... | 138/46 |
| 3,216,451 A | * | 11/1965 | Smallpeice ................. | 137/861 |
| 3,298,394 A | * | 1/1967 | Chorkey ..................... | 137/860 |
| 3,409,050 A | * | 11/1968 | Weese ........................ | 138/45 |
| 3,847,178 A | * | 11/1974 | Keppel ..................... | 137/515.7 |
| 4,000,857 A | * | 1/1977 | Moen ....................... | 239/428.5 |
| 4,364,523 A | * | 12/1982 | Parkison et al. ........ | 239/533.14 |

(Continued)

FOREIGN PATENT DOCUMENTS

DE    19743740    4/1999

(Continued)

*Primary Examiner*—Patrick F Brinson
(74) *Attorney, Agent, or Firm*—Volpe and Koenig, P.C.

(57) ABSTRACT

A flow regulator (10) having a regulator housing (1) which is provided with a control device (8a) having a central body (3a) in a passage channel (2). An annular throttle body (4a) produced from an elastic material bounds the central body (3a) and defines a control gap (6a) between the throttle body (4a) and an adjacent peripheral surface (5a) that is provided with control recesses (7a) that are oriented in a flow direction (Pf1, Pf2). The passage cross-section of the control gap can be varied by the throttle body which is deformed by the pressure difference caused during throughflow. In the present flow regulator (10), there are two control devices (8a, 8b) arranged one behind the other the longitudinal direction of the passage channel (2), with the two control devices (8a, 8b) being configured for different throughputs and/or pressure ranges. The control device (8b) for the lower throughput or the lower pressure range has at least one bypass channel or similar passage opening (11) which can be opened and closed, and which is open for the higher throughput or higher pressure range and is closed for the lower throughput or lower pressure range.

9 Claims, 2 Drawing Sheets

U.S. PATENT DOCUMENTS

| | | | | |
|---|---|---|---|---|
| 4,562,960 A | * | 1/1986 | Marty et al. | 239/72 |
| 6,571,831 B1 | * | 6/2003 | Hart | 138/46 |
| 6,595,235 B1 | | 7/2003 | Zhang | |
| 6,631,738 B2 | * | 10/2003 | Jiang | 138/46 |
| 6,695,011 B2 | * | 2/2004 | Sochtig | 138/43 |
| 2003/0209278 A1 | * | 11/2003 | Sochtig | 138/43 |

FOREIGN PATENT DOCUMENTS

| | | |
|---|---|---|
| DE | 19851151 | 5/2000 |
| DE | 10228490 | 11/2003 |
| GB | 2341660 | 3/2000 |

* cited by examiner

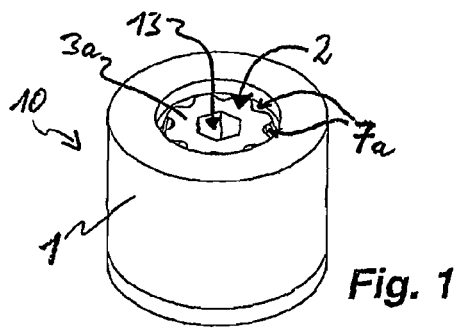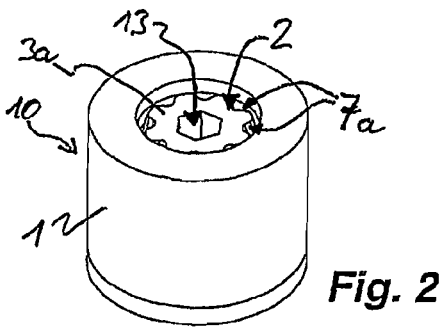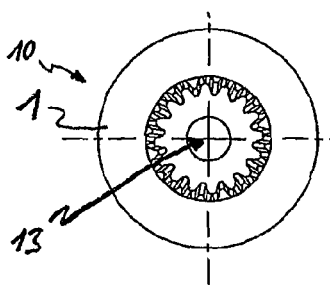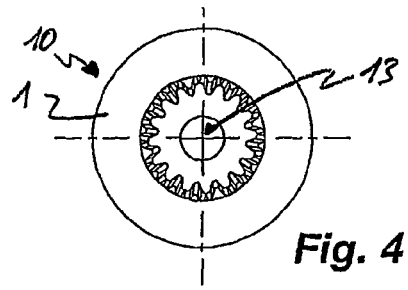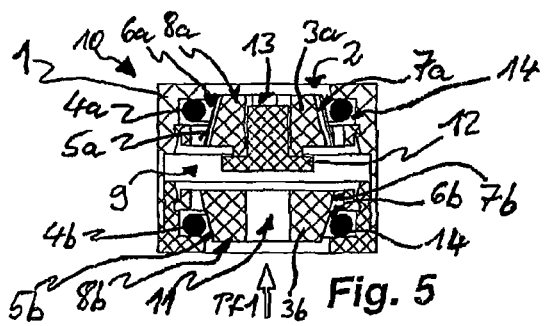

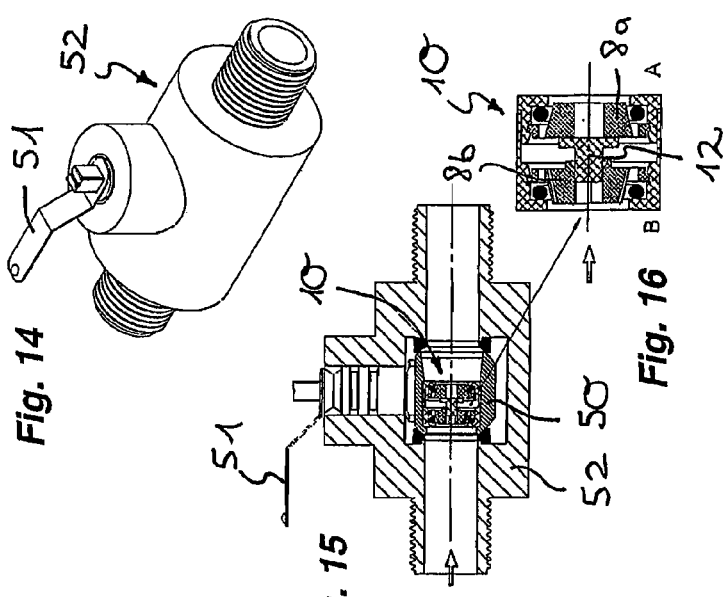
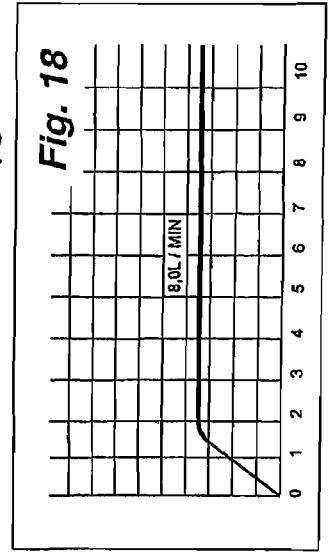
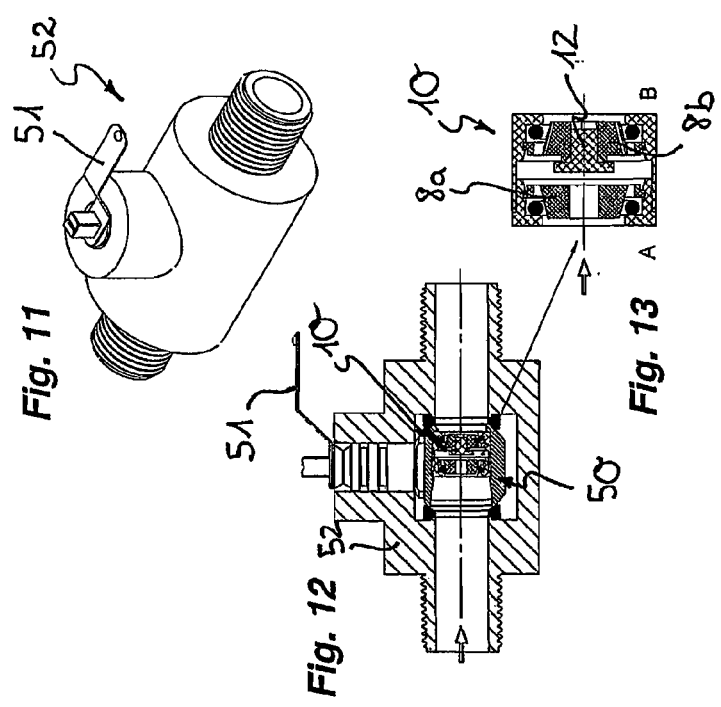
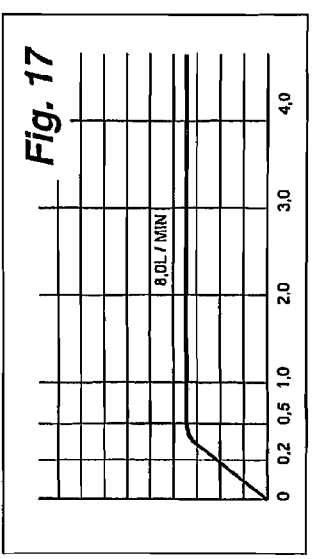

1

FLOW REGULATOR

BACKGROUND

The invention relates to a flow regulator with a regulator housing, which has a control device with a central body in a passage channel. An annular throttle body made from elastic material surrounds this central body and bounds a control gap between itself and an adjacent peripheral surface provided with control recesses, which are spaced apart from each other in the circumferential direction and which are oriented in the flow-through direction. The passage cross section of this control gap can be changed by the throttle body, which deforms under the pressure difference formed by the flow.

From FIG. 2 of DE 198 51 151 A1, a flow regulator of the type noted above is already known. This flow regulator has, in its regulator housing, a throttle body, which is made from elastic material and which can be deformed under the pressure of the water flowing through. This throttle body bounds a control gap between itself and the adjacent housing inner periphery, with the passage cross section of this control gap being variable by the throttle body deforming under the pressure difference formed by the flow. Here, the housing inner periphery forms a circumferential surface provided with control recesses, which are spaced apart from each other in the circumferential direction and which are oriented in the flow-through direction.

This flow regulator is provided for different flow rates. To be able to change the flow cross section of the control gap between two flow rates, a change of the relative position of the throttle body and peripheral casing surface is possible. If the flow regulator carries a flow from top to bottom, then the throttle body deforms according to the pressure of the flowing water and therefore approaches the groove flanks of a first groove, whereby the flow is bound to a first desired value. If the flow regulator shown in FIG. 2 of DE 198 51 151 A1 is taken from the water line and rotated so that it is arranged in a position rotated by 180°, then the intermediate space between the throttle body and the groove flanks of the now decisive second groove is larger, so that now a different desired value of the flow is given.

From FIG. 4 of DE 198 51 151 A1, a flow regulator is known, which has a disk-shaped regulator housing. On the ends of the disk facing away from each other there are holding grooves, which are each designed for holding the throttle body. On their outer peripheral surfaces, these holding grooves have a different outer diameter, which determines the different desired values of the corresponding control gaps. By clipping an attachment screen onto each disk end of the regulator housing, the throttle body is held securely in the holding groove corresponding to the desired value.

In FIGS. 7 and 8 of DE 198 51 151 A1, a flow regulator is shown, in which the peripheral surface bounding the control gap is formed by separating walls, which are connected to the regulator housing via weak points or bending points. These separating walls are pressured on their sides facing away from the control gap by curved blocks, which are formed on rotary slide valves that can be turned from the outside. If the rotary slide valve is turned, then the curved blocks force the corresponding separating walls radially inwardly, which changes the open through-flow cross section and sets the desired value of the limiting flow.

These flow regulators, however, are relatively complicated in their production and construction.

SUMMARY

Therefore, there is the objective, in particular, of creating a flow regulator of the type noted above, which allows the maximum flow rate to be changed and which is nevertheless relatively simple in its production and construction.

The solution according to the invention to meet this objective is provided in that, in particular, in the flow regulator of the type noted above, two control devices arranged one behind the other in the longitudinal extent of the passage channel are provided with the features indicated in the preamble of Claim 1, the two control devices are constructed for different flow rates and/or different pressure ranges, and the control device for the lower flow rate and/or the lower pressure range has, in addition to its control gap, at least one passage opening, which acts as a bypass channel for the control device and which can be opened and closed and which is opened for the higher flow rate or the higher pressure range and which is closed for the lower flow rate or the lower pressure range.

In the flow regulator according to the invention, two control devices are provided, which are constructed for different flow rates and/or different pressure ranges. For the lower flow rate or the lower pressure range, the one or more passage openings are closed to the control device designed for the lower flow rate or the lower pressure range, so that the flow medium, for example, water, must pass the flow path between the central body and throttle body of the control device for the higher flow rate or the higher pressure range and also the flow path between the central body and throttle body of the control device for the lower flow rate or the lower pressure range. Here, the characteristics of the flow regulator are set by the control device designed for the lower flow rate or the lower pressure range.

For the higher flow rate or the higher pressure range, the one or more passage openings are opened to the control device for the lower flow rate or the lower flow range, so that the flow medium, for example, water, must pass only the flow path between the central body and throttle body of the control device for the higher flow rate or the higher pressure range, but not the flow path between the central body and throttle body of the control device for the lower flow rate or the lower pressure range, but instead bypasses the control device for the lower flow rate or the lower pressure range through the passage opening. In this case, the characteristics of the flow regulator according to the invention are designed only by the control device for the higher flow rate or the higher pressure range.

Thus, the maximum flow rate or the provided pressure range can be changed easily and quickly by opening or closing the passage opening provided according to the invention.

The flow regulator according to the invention can be used advantageously, for example, in gas wall heating devices and electrode through flow heaters, in which a flow rate of the water to be heated is adapted to the different flow temperatures in summer and winter.

A preferred improvement according to the invention provides that the one or more passage openings can be opened and closed as a function of the flow direction. In this improved embodiment, the flow regulator located in a water line must be turned only to adjust its characteristics, namely the flow rate and/or the provided flow quantity, to the desired value.

For setting the maximum flow rate or the provided pressure range, preferably a closing element adjustable between an open position and a closed position can be provided for opening and closing the passage opening(s) of the control device for the lower flow rate or the lower pressure range.

Here, it is useful when the closing element is constructed as a closing peg and is supported so that it can shift in the axial direction in the control device for the higher flow rate or the higher pressure range. This allows a simple adjustment of the closing element between the open and the closed position. In addition, the closing element can be integrated into the flow regulator in a space-saving way, which allows a small installation size of the flow regulator.

It is especially advantageous when the control device for the higher flow rate or the higher pressure range has a guide opening for the closing element, with this opening being open towards the axial end of the regulator housing allocated to this control device. If the flow medium flows from this axial end of the regulator housing, the closing element is pressured by the medium flowing into the guide opening and moved automatically into its closed position. For the reverse flow direction, the closing element is also pressured by the medium in this case flowing in through the passage opening(s) and moved into its open position. The change to the desired maximum flow rate is thus performed automatically through the selection of the flow direction of the medium through the flow regulator. Manual positioning of the closing element is not necessary.

To change the flow direction in the housing interior of the flow regulator according to the invention and to be able to bring the closing element into the relative position allocated to a certain flow rate or a certain flow range, an improvement of the invention provides that the flow regulator is provided in a reversing part connected into the fluid line and that the reversing part is supported in the fluid line so that it can turn for changing the flow direction in the flow regulator for an otherwise constant flow direction in the adjacent line sections of the fluid line.

BRIEF DESCRIPTION OF THE DRAWINGS

Additional features of the invention emerge from the following description of an embodiment according to the invention in connection with the claims and also the drawings. The individual features can be implemented individually or in combination for an embodiment according to the invention.

Shown are:

FIGS. 1 to 10 a flow regulator with two control devices, wherein the flow regulator is shown in a perspective view (FIGS. 1 and 2), in a top view of one housing end (FIGS. 3 and 4), in a longitudinal section (FIGS. 5 and 6), in a top view of the other housing end (FIGS. 7 and 8), and the output curves of its two function positions having different flow rates according to FIGS. 1, 3, 5, and 7 on one hand and FIGS. 2, 4, 6, and 8 on the other hand, FIGS. 11 to 16 a reversing part for changing the flow direction of the flow regulator located in the reversing part, wherein this reversing part is shown in its two set positions in a perspective view (FIGS. 11, 14), in a longitudinal section (FIGS. 12, 15), and in a longitudinally sectioned detailed view in the region of the flow regulator located in the reversing part (FIGS. 13, 16), and FIGS. 17 to 18 the output curves of a flow regulator constructed according to FIGS. 1 to 10 or 11 to 16, which here is provided for different pressure ranges.

DETAILED DESCRIPTION OF THE PREFERRED EMBODIMENTS

FIGS. 1 to 10 show a flow regulator 10, which can be connected into a fluid line, especially into a sanitary water line, in order to adjust the quantity of water flowing per unit of time to a certain maximum value independent of the water pressure. The flow regulator 10 has a regulator housing 1, which has two control devices 8a, 8b in a passage channel 2, each with a central body 3a, 3b. The central bodies 3a, 3b are each surrounded by an annular throttle body 4a, 4b made from elastic material, which bound a control gap 6a, 6b between themselves and an adjacent peripheral surface 5a, 5b (FIG. 5).

The passage cross section of the control gaps 6a, 6b can be changed by a throttle body 4a, 4b deforming under the pressure different created by the flow of the fluid. In this way, control recesses 7a, 7b, which are spaced apart from each other in the circumferential direction and which are oriented in the direction of flow and into which the throttle bodies 4a, 4b can extend for an increased pressure of the fluid, are provided on the peripheral surface 6a, 5b.

For the control device 8a, in the rest position the open through-flow cross section of the control gap 6a is greater than the open through-flow cross section of the control gap 6b of the control device 8b, whereby the control device 8a is constructed for a larger maximum flow rate than the control device 8b.

The two control devices 8a, 8b are arranged at a distance from each other in the regulator housing 1 and bound an interior 9 with their facing ends.

The control device 8b for the lower flow rate has a passage opening 11, which creates a passage connection from the in-flow side of the flow regulator 10 allocated to the control device 8b and the interior 9, in its central body 3b.

In the central body 3a of the control device 8a for the higher flow rate, an axially displaceable closing element 12 is supported in a guide opening 13, which extends from the in-flow side of the flow regulator 10 allocated to the control device 8a into the interior 9, wherein the interior 9 is sealed relative to the guide opening 13.

For changing the maximum flow rate, the flow direction Pf1, Pf2 is changed for the flow regulator 10.

In the flow direction Pf1 from FIG. 5, the fluid flowing through the passage opening 11 into the interior 9 presses the closing element 12 into the guide opening 13, so that the passage opening 11 is opened and acts as a bypass for the control device 8b, which has the lower flow rate and which is thus non-functional. The fluid flows from the interior 9 through the control device 8a for the higher flow rate, with which the flow rate is regulated.

In the flow direction Pf2 from FIG. 6, the fluid flowing into the guide opening 13 presses the closing element 12 into its closed position, in which it pressures the central body 3b of the control device 8b and thus closes the passage opening 11. The fluid flows through the control device 8a, against its actual direction of use, into the interior 9 and then through the control device 8b for the lower flow rate. The actual flow rate is here determined by the control device 8b for the lower flow rate, so that the control device 8a for the higher flow rate is effectively non-functional.

The flow regulator 10 shown here can be used advantageously in gas wall heaters or electrode through flow heaters, in which the flow rate of the water to be heated is adjusted to the different flow temperatures of the water in summer and in winter.

In FIGS. 11 to 16, a reversing part 50 is shown, which is designed for changing the direction of flow in the flow regulator 10 for an otherwise constant flow direction in the adjacent sections of the fluid line. As is clear from a comparison of FIGS. 11 to 13 on one hand and FIGS. 14 to 16 on the other hand, the reversing part 50 is supported so that it can rotate in the fluid line. To be able to change the direction of flow in the housing interior of the flow regulator 10 and to be able to bring the closing element 12 into the open or closed position allocated to a certain flow rate and/or to a certain pressure range, the flow regulator 10 can be held in the reversing part 50, which is supported so that it can rotate in the fluid line at the end of the flow direction in the flow regulator 10 for an otherwise constant flow direction in the adjacent sections. This reversing part is supported so that it can rotate in a ball valve-type output adapter 52, which can be inserted into a fluid line. This line adapter, which can also be used as a ball valve and whose reversing part 50 can also be used as a valve ball simultaneously, can be activated from the outside via a lever 51.

In FIGS. 9 and 10, the flow curves are shown, which are set when the flow regulator 10 is operated in the functional position shown in FIG. 5 on one hand and in the functional position shown in FIG. 6 on the other hand.

In FIGS. 17 and 18, the output curves of a flow regulator are shown, which correspond in setup and construction to the flow regulator 10 in FIGS. 1 to 10 on one hand and FIGS. 11 to 16 on the other hand. From the output curves according to FIGS. 17 and 18, however, it is clear that this flow regulator is provided here for different pressure ranges.

It is understood that changing the flow direction in the flow regulator shown here, a flushing flow is also generated simultaneously, which entrains dirt particles possibly deposited on the ends in the flow regulator and removes these from the region of the flow regulator.

By considering the figures together it becomes clear that the flow regulator 10 has a modular construction, such that at least one of the control devices 8a, 8b can be exchanged, when needed, for a different control device, which is distinguished by a different flow rate or a different pressure range. Through this modular construction of the flow regulator 10 shown here, it can be easily adapted in its characteristics to the needed flow rates or pressure ranges.

The invention claimed is:

1. Flow regulator (10) comprising a regulator housing (1) having a passage channel (2) in which there are two control devices (8a, 8b) each having a central body (3a), surrounded by an annular throttle body (4a) made from elastic material, wherein the throttle body (4a) bounds a control gap (6a) between itself and an adjacent peripheral surface (5a) provided with control recesses (7a), which are spaced apart from each other in a circumferential direction and which are oriented in a flow direction (Pf1, Pf2), a passage cross section of the control gap can be changed by the throttle body (4a) deforming under a pressure difference formed by a flow, the two control devices (8a, 8b) are arranged one behind the other in a longitudinal extent of the passage channel (2), the two control devices (8a, 8b) are constructed for at least one of different flow rates or different pressure ranges, and a first of the control devices (8b) has at least one bypass channel or a passage opening (11) for at least one of a lower flow rate or a lower pressure range, and the passage opening (11) can be opened and closed, and is opened for a higher flow rate or a higher pressure range and is closed for the lower flow rate or the lower pressure range.

2. Flow regulator according to claim 1, wherein the one or more passage openings (11) can be opened and closed as a function of the flow direction (Pf1, Pf2).

3. Flow regulator according to claim 1, wherein the control devices (8a, 8b) are arranged at a distance from each other in the regulator housing (1).

4. Flow regulator according to claim 1, further comprising a closing element (12) adjustable between an open position and a closed position for opening and closing the passage opening(s) (11) of the first control device (8b) for the lower flow rate.

5. Flow regulator according to claim 4, wherein the closing element (12) is constructed as a closing peg and is supported so that it can shift in an axial direction in the control device (8a) for the higher flow rate.

6. Flow regulator according to claim 5, wherein the control device (8a) for the higher flow rate has a guide opening (13) for the closing element (12) that is open towards an axial end of the regulator housing (1) allocated to the control device (8a).

7. Flow regulator according to claim 1, wherein the central bodies (3a, 3b) of the control devices are each constructed as control cones tapering uniformly.

8. Flow regulator according to claim 1. wherein the throttle bodies (4a, 4b) are each held on a housing inner periphery of the regulator housing (1) in a groove (14) or a throttle body holder.

9. Flow regulator according to claim 1, further comprising a reversing part connected in a fluid line in which the flow regulator (10) is positioned and the reversing part is supported so that it can rotate in the fluid line for changing the flow direction in the flow regulator (10) for an otherwise constant flow direction in adjacent line sections of the fluid line.

* * * * *